Patented Jan. 27, 1948

2,434,982

UNITED STATES PATENT OFFICE 2,434,982

ORGANIC POLYHYDROXY COMPOUND

Joseph E. Bludworth, Corpus Christi, Tex., and Donald P. Easter, Washington, D. C., assignors to Celanese Corporation of America, a corporation of Delaware No Drawing. Original application September 19, 1944, Serial No. 554,858. Divided and this application April 25, 1946, Serial No. 664,979

5 Claims. (Cl. 260—586)

This invention relates to the novel organic compound 1-(3,4-dihydroxycyclohexyl)-1,2-dihydroxybutanone having the following formula

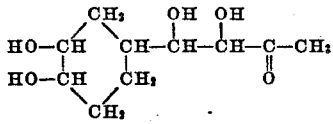

This application is a division of our application S. No. 554,858, filed September 19, 1944.

An object of our invention is the preparation of 1-(3,4-dihydroxycyclohexyl)-1,2-dihydroxybutanone.

Other objects of our invention will appear from the following detailed description.

In accordance with the Diels-Alder reaction, the condensation of acrolein with butadiene yields Δ³-tetrahydrobenzaldehyde. On reacting this aldehyde with acetone in the presence of potassium hydroxide, β-(Δ³-tetrahydrophenyl)-vinyl methyl ketone is formed,

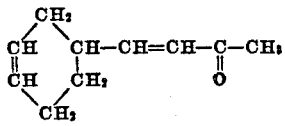

which yields many valuable compounds on further reaction.

We have now discovered that by effecting the oxidation of β-(Δ³-tetrahydrophenyl)-vinyl methyl ketone, a novel higher molecular weight polyhydric alcohol may be obtained, namely, 1-(3,4-dihydroxycyclohexyl)-1,2-dihydroxybutanone.

As suitable oxidizing agents there may be mentioned potassium permanganate, hydrogen peroxide or sodium chlorate but the most desirable results are obtained employing potassium permanganate. The oxidation may be carried out at temperatures of from 0 to 15° C. When employing potassium permanganate as the oxidizing agent, the reaction is preferably allowed to proceed gradually, employing from 30 to 90 parts by weight of a 1 to 7% aqueous solution of the potassium permanganate, the reactants being held at a temperature of 0 to 5° C. for 1 to 4 hours and then allowed to rise to room temperature. The reaction may be completed by heating at about 100° C. for 1 to 3 hours. The 1-(3,4-dihydroxycyclohexyl)-1,2-dihydroxybutanone formed may be separated from the reaction by extraction employing a suitable water-immiscible solvent such as diethyl ether.

In order further to illustrate our invention, but without being limited thereto, the following example is given:

Example 30 parts by weight of β-(Δ³-tetrahydrophenyl)-vinyl methyl ketone are suspended in 200 parts of water and cooled to 5° C. A solution of 63 parts by weight of potassium permanganate in 1000 parts of water is added over a period of one and one-half hours while maintaining the temperature below 5° C. at all times. The mixture obtained is allowed to warm at room temperature, i. e. about 20° C., and then heated on a steam bath for one hour. The precipitated manganese dioxide is filtered off, the filtrate saturated with sodium sulfate and then extracted with ether. The ether extract is dried over anhydrous sodium sulfate and is then evaporated to remove the ether. The residue comprises impure 1-(3,4-dihydroxycyclohexyl)-1,2-dihydroxybutanone. The yield obtained is over 95% of theoretical. This compound is compatible with cellulose acetate and may be employed as a plasticizer therefor.

It is to be understood that the foregoing detailed description is given merely by way of illustration and that many variations may be made therein without departing from the spirit of our invention.

Having described our invention, what we desire to secure by Letters Patent is:

1. As a new compound, 1-(3,4-dihydroxycyclohexyl)-1,2-dihydroxybutanone having the following formula

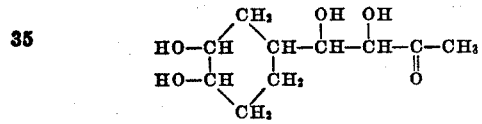

2. Process for the production of 1-(3,4-dihydroxycyclohexyl)-1,2-dihydroxybutanone, which comprises subjecting β-(Δ³-tetrahydrophenyl)-vinyl methyl ketone to the action of an aqueous solution of potassium permanganate.

3. Process for the production of 1-(3,4-dihydroxycyclohexyl)-1,2-dihydroxybutanone, which comprises subjecting β-(Δ³-tetrahydrophenyl)-vinyl methyl ketone to the action of a 1 to 7% aqueous solution of potassium permanganate.

4. Process for the production of 1-(3,4-dihydroxycyclohexyl)-1,2-dihydroxybutanone, which comprises subjecting 30 parts by weight of β-(Δ³-tetrahydrophenyl)-vinyl methyl ketone to the action of 35 to 90 parts by weight of a 1 to 7% aqueous solution of potassium permanganate.

5. Process for the production of 1-(3,4-dihydroxycyclohexyl)-1,2-dihydroxybutanone, which comprises subjecting 30 parts by weight of β-(Δ³-tetrahydrophenyl)-vinyl methyl ketone to the action of 35 to 90 parts by weight of a 1 to 7% aqueous solution of potassium permanganate at a temperature of 0 to 15° C. for 1 to 4 hours, raising the temperature to 60 to 100° C. for 1 to 3 hours, and separating the 1-(3,4-dihydroxycyclohexyl)-1,2-dihydroxybutanone formed.

JOSEPH E. BLUDWORTH.
DONALD P. EASTER.

REFERENCES CITED

The following references are of record in the file of this patent:

FOREIGN PATENTS

| Number | Country | Date |
|---|---|---|
| 508,526 | Great Britain | July 3, 1939 |